US007623230B2

(12) United States Patent
Porjo

(10) Patent No.: US 7,623,230 B2
(45) Date of Patent: Nov. 24, 2009

(54) OPTICAL SENSOR CALIBRATION

(75) Inventor: Niko Santeri Porjo, Piikkio (FI)

(73) Assignee: Nokia Corporation, Espoo (FI)

( * ) Notice: Subject to any disclaimer, the term of this patent is extended or adjusted under 35 U.S.C. 154(b) by 90 days.

(21) Appl. No.: 11/977,230

(22) Filed: Oct. 23, 2007

(65) Prior Publication Data

US 2009/0100903 A1 Apr. 23, 2009

(51) Int. Cl.

| | |
|---|---|
| ***G01J 1/10*** | (2006.01) |
| ***G01J 1/12*** | (2006.01) |
| ***G01C 17/38*** | (2006.01) |
| ***G01D 18/00*** | (2006.01) |

(52) U.S. Cl. .................... 356/243.1; 356/229; 356/230; 356/243.4; 356/243.8; 250/252.1; 702/95

(58) Field of Classification Search ... 356/243.1–243.8, 356/228, 229, 230, 621; 250/252.1, 221, 250/341.5, 559.38; 73/1, 75, 1.86; 702/94–95
See application file for complete search history.

(56) References Cited

U.S. PATENT DOCUMENTS

| | | | | |
|---|---|---|---|---|
| 5,177,563 | A * | 1/1993 | Everett et al. | 356/621 |
| 5,907,229 | A * | 5/1999 | Snell | 318/569 |
| 6,138,495 | A * | 10/2000 | Paltieli et al. | 73/1.86 |
| 6,157,040 | A * | 12/2000 | Bauer | 250/559.38 |
| 6,606,171 | B1 | 8/2003 | Renk et al. | 358/475 |
| 6,770,869 | B2 * | 8/2004 | Patterson et al. | 250/252.1 |
| 6,792,370 | B2 * | 9/2004 | Satoh et al. | 702/95 |
| 6,963,428 | B1 | 11/2005 | Gann | 358/474 |

* cited by examiner

*Primary Examiner*—Sang Nguyen
(74) *Attorney, Agent, or Firm*—Harrington & Smith, PC

(57) ABSTRACT

An apparatus including: an optical sensor comprising an optical transmitter and an optical receiver; and a calibration system configured to change calibration of the sensor when a measurement taken at the optical receiver, while the optical transmitter is on and the apparatus is in use, passes a test.

17 Claims, 3 Drawing Sheets

OPTICAL SENSOR CALIBRATION

FIELD OF THE INVENTION

Embodiments of the present invention relate to optical sensor calibration.

BACKGROUND TO THE INVENTION

Many optical sensors need to be calibrated.

It may be possible to calibrate a sensor when it is manufactured. However, this will typically require the sensor to have some non-volatile memory for storing the calibration data and this is undesirable as it raise the size, cost and complexity of the sensor. Furthermore, such calibration does not take into account the situation in which the sensor is used.

It may be possible to calibrate a sensor when it is in-situation within an apparatus, for example, as part of the production line for the apparatus. Whenever a measurement is taken at the optical sensor in-situ the measurement includes a ‘signal’ from a target and a ‘systematic error’. The production line may need to be adapted so that multiple different reference targets, for example separate white and black targets, are introduced to determine the systematic error. This leads to inefficiencies in production.

It would therefore be desirable to provide for improved calibration of an optical sensor.

BRIEF DESCRIPTION OF VARIOUS EMBODIMENTS OF THE INVENTION

According to various embodiments of the invention there is provided an apparatus comprising: an optical sensor comprising an optical transmitter and an optical receiver; and a calibration system configured to change calibration of the sensor when a measurement taken at the optical receiver, while an optical transmitter is on and the apparatus is in use, passes a test.

The process of determining the systematic error is moved from the production line into the apparatus so that it occurs during use. The term ‘during use’ or ‘in use’ refers to the period post production when the apparatus can be used, whether or not it is actually being used by a user. This is made possible by the test, in use, which prevents inappropriate measurements being used to determine the systematic error.

The apparatus, in use, is therefore able to calibrate the sensor automatically when it is in a normally occurring environment, such as on a night stand in a dark bedroom, without additional special apparatus because if a calibration measurement is taken that is unsuitable for calibration it will fail the test and not be used for calibration.

The test comprises comparison of the measurement against a threshold. The threshold depends upon a contemporaneous measurement taken at the optical receiver of the sensor while the optical transmitter of the sensor is off. The threshold may have a reflector proximity test value or a sensor saturation test value depending upon the value of the contemporaneous measurement.

The calibration system may be configured to change calibration of the sensor by: generating a compensation value using the measurement; compensating a reference measurement using the compensation value; and calibrating the sensor using the compensated reference value.

The apparatus may comprise a memory system configured to store, during production of the apparatus, a reusable reference measurement taken at the optical receiver while the optical transmitter of the sensor is on and to store a default compensation value for initial calibration of the sensor.

The calibration system may be configured to re-calibrate the sensor when a scheduled measurement taken at the optical receiver of the sensor, while the optical transmitter is on, passes the test.

The apparatus may comprise a protective screen in an optical path between the optical transmitter and the optical receiver whereby scheduled re-calibration compensates for progressive wear to the protective screen and for the presence of impurities such as dust, oil etc.

According to various embodiments of the invention there is provided a method of automatically re-calibrating an optical sensor comprising: taking a measurement at the optical receiver of the sensor while an optical transmitter of the sensor is on; changing calibration of the sensor only if the taken measurement passes a test.

According to various embodiments of the invention there is provided a method comprising: enabling taking of a reusable reference measurement at an optical receiver of a sensor while an optical transmitter of the sensor is on and enabling storage of the reusable reference measurement; enabling taking, subsequently, of a measurement at the optical receiver of the sensor while the optical transmitter of the sensor is on; enabling determination of whether the subsequent measurement passes a test; if the subsequent measurement does pass the test, enabling generation of a compensation value using the subsequent measurement; enabling compensation of the reusable reference measurement using the compensation value; and enabling calibration of the sensor using the compensated reference value.

According to various embodiments of the invention there is provided a method comprising: enabling taking of a reference measurement at an optical receiver of a sensor while an optical transmitter of the sensor is on and enabling storage of the reference measurement; enabling, according to a schedule, at a first time, switching on the optical transmitter of the sensor and taking a first measurement at the optical receiver of the sensor, and at a second time, switching on the optical transmitter of the sensor and taking a second measurement at the optical receiver of the sensor enabling generation of a compensation value using a selected one of the first and second measurements; enabling compensation of the reference measurement using the compensation value; and enabling calibration of the sensor using the compensated reference value.

According to various embodiments of the invention there is provided a method comprising: making and storing an optical sensor reference measurement; storing data for an initial default calibration of the sensor; and enabling device specific re-calibration in use using the stored reference measurement and contemporaneous measurements at the optical sensor.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 1:
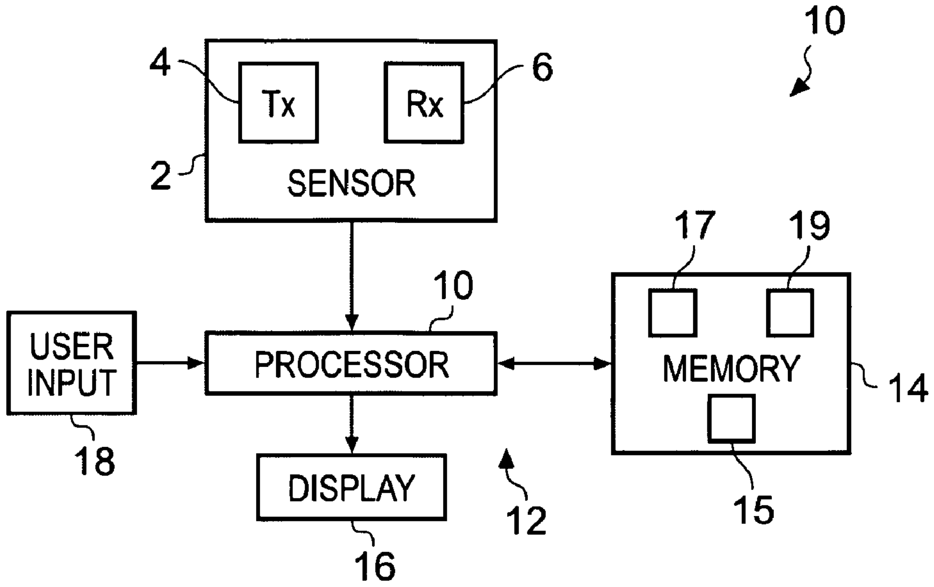
FIG. 1 schematically illustrates an apparatus comprising: an optical sensor and a calibration system.

FIG. 1 schematically illustrates an apparatus 10 comprising: an optical sensor 2 and a calibration system 12.

The optical sensor 2 comprises an optical transmitter 4 and one or more optical receivers 6. An optical receiver 6 may be a multi-channel optical receiver that includes a plurality of optical (sub) receivers 6 each of which is dedicated to a different frequency spectrum or channel. Reference to a receiver 6 may be a reference to one or more of a single channel optical receiver, a multi-channel optical receiver and a sub-receiver of a multi-channel optical receiver. A receiver may be configurable so that it receives one or more channels and the bandwidth of the channel(s) may also be controlled.

The calibration system 12 in this example comprises a memory 14 and a processor 16. The memory 14 may be read from and written to by the processor 16. The operation of the calibration system is controlled by computer program 15 stored in memory 14.

In an alternative implementation, the calibration system may be provided by an integrated circuit such as an application specific integrated circuit.

Figure 5:
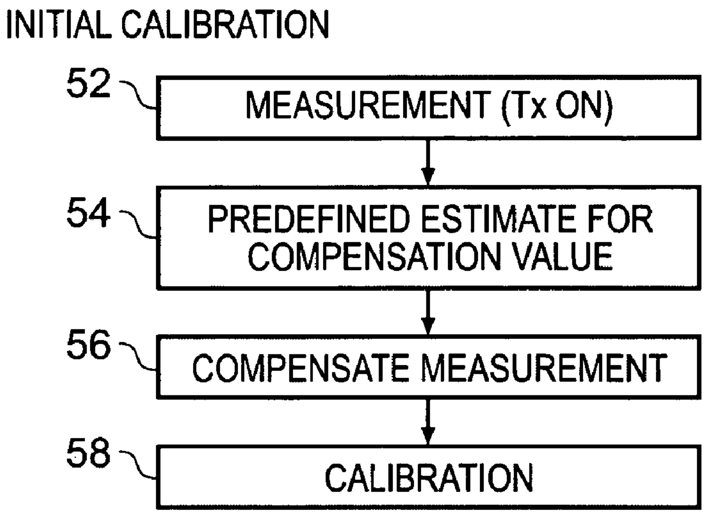
FIG. 5 illustrates a set-up procedure for the calibration system 12.
Figure 6:
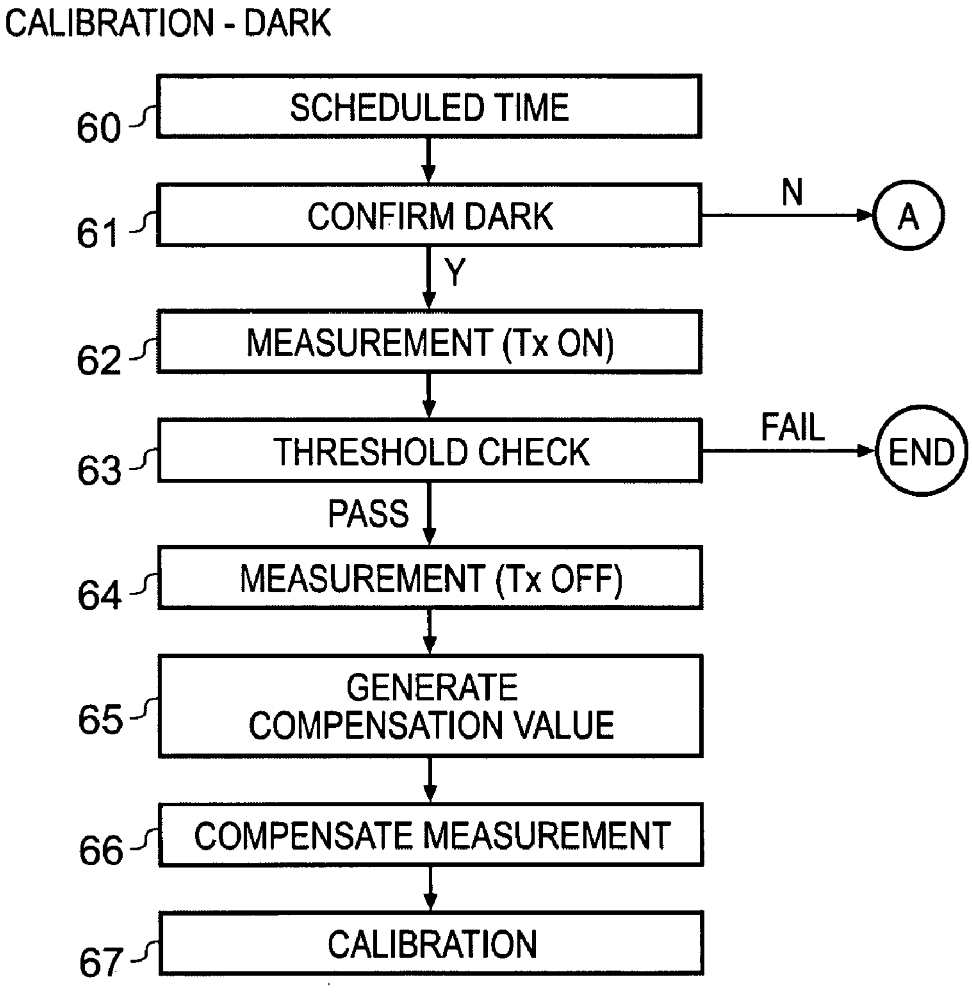
FIG. 6 illustrates the process for re-calibration according to a schedule.
Figure 7:
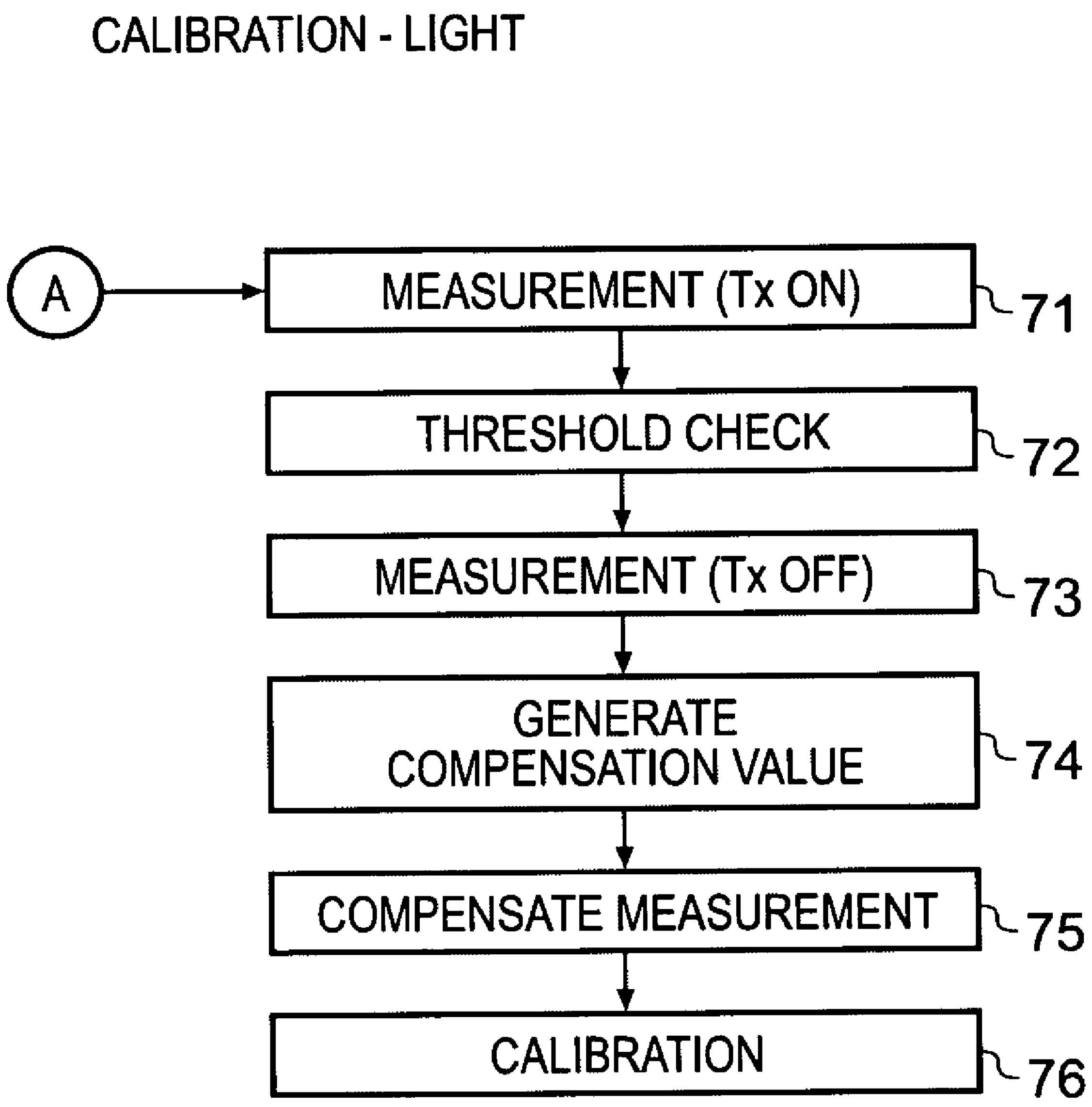
FIG. 7 illustrates the process for re-calibration when the apparatus 10 is in a light environment.

The computer program 15 has instructions that provide the logic and routines that enables the calibration system 12 to perform the methods illustrated in FIGS. 5 to 7.

The computer program may arrive at the apparatus 10 via an electromagnetic carrier signal or be copied from a physical entity such as a computer program product, a memory device or a record medium such as a CD-ROM or DVD.

The apparatus 10 may propagate or transmit the computer program as a computer data signal.

The calibration system 12 is configured to change calibration for the sensor 2 in response to one or more measurements taken, during use of the apparatus, at the optical receiver 6 while the optical transmitter 4 is switched on. For calibration to occur, a measurement must pass a test. This ensures that calibration only occurs appropriately.

For example, a test may be used to check that when the apparatus is in a dark environment there are no nearby reflectors which would affect the measurement and hence the calibration.

As another example, a test may be used to check that when the apparatus is in a light environment the sensor 2 is not saturated.

The calibration procedure is described in more detail below.

The apparatus 10 is typically an electronic device. It may be a module or sub-component of a final product or a final product itself. The apparatus 10 may be a mobile cellular telephone or another hand-portable electronic device. The apparatus may, for example, include a display 16 and user input 18 as part of a man machine interface.

Whenever a measurement is taken at the optical receiver 6, while the optical transmitter 4 is switched on, the measurement includes a 'signal' 24 from a target and 'systematic error' 26 from elsewhere including, for example, a protective screen 20 for the sensor 2.

Figure 2A:
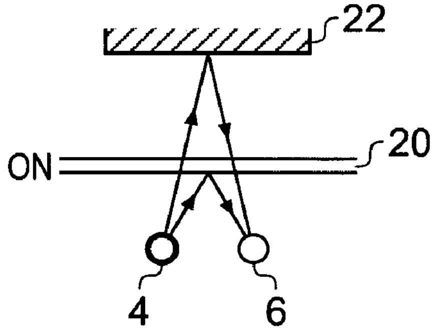
FIGS. 2A and 2B illustrate initial calibration.
Figure 2B:
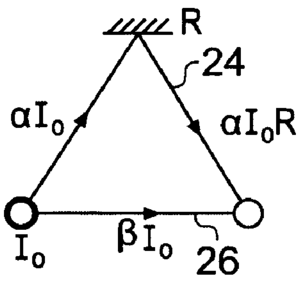

Referring to FIGS. 2A and 2B, a protective screen 20 lies in an optical path between the optical transmitter and the optical receiver and reflections from the protective screen produce systematic error 26. The systematic error 26 will vary as the protective screen 20 becomes worn and scratched.

Embodiments of the invention relate to effective mechanisms for determining the 'systematic error' 26 and using that to recover the signal 24 from a measurement made at the optical receiver 6. The signal 24 may then be used to re-calibrate the sensor 2. Scheduled re-calibration compensates for slowly varying changes such as wear to the protective screen 20.

FIGS. 2A and 5 illustrates a set-up procedure for the calibration system 12. This set-up procedure will typically be carried out at the time the apparatus 10 is being produced. It may be integrated into a production line for the apparatus 10.

A reference target 22 of known spectral reflectance, typically a white target, is used.

The optical transmitter 4 transmits light a proportion of which is reflected by the reference target 22 towards the optical receiver 6 (signal 24) and a proportion of which is reflected by the protective screen 20 (or other nearby items inside the apparatus or outside the apparatus) towards the optical receiver 6 (systematic error 26).

At block 52, FIG. 5, simultaneous measurement is taken at the optical receiver 6. This measurement includes a reference 'signal' 24 from the reference target 22 and 'systematic error' 26 from elsewhere including the protective screen 20.

The measurement is stored as a re-usable reference measurement 17 in the memory 14.

At block 54, FIG. 5, a default systematic error value is stored in the memory 14 as a default compensation value 19. This is a value that is generally appropriate for this type of apparatus but it has not been specifically determined for this particular apparatus. The default compensation value 19 may be re-used for all apparatus 10 produced.

The compensation value is a dark calibration value representing an expected measurement value at the optical receiver when the optical transmitter 4 is on as a result of light that has propagated with the internal volume defined by the apparatus and there are no other light sources including surfaces outside the apparatus that reflect light transmitted by the optical transmitter 4.

At block 54, FIG. 5, the stored reference measurement 17 is compensated using the default compensation value 19. The default compensation value 19 is subtracted from the reference value 17 to obtain a reference signal. This set may occur at production or post-production when the apparatus 10 is first in use.

At block 56, the reference signal is used for calibration. Calibration typically involves adapting color calculation matrices that are used to process the output of the sensor 2. This process is known to those skilled in the art.

Figure 3A:
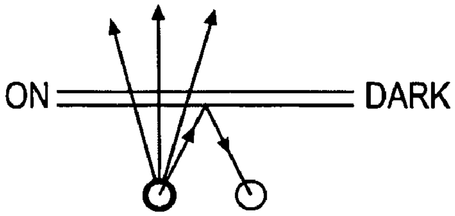
FIGS. 3A and 3B illustrate operation of the sensor in a dark environment, when the optical transmitter is on and off.
Figure 3B:
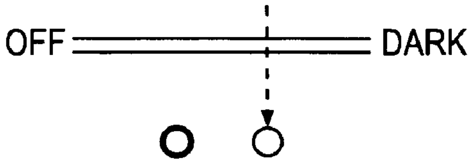
Figure 4A:
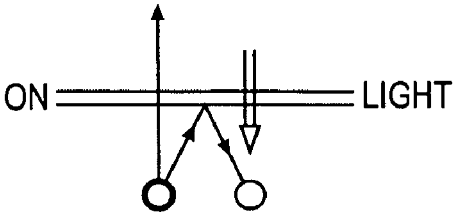
FIGS. 4A and 4B illustrate operation of the sensor 2 in a light environment, when the optical transmitter is on and off.
Figure 4B:
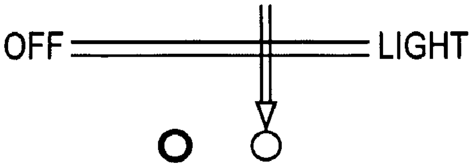

FIGS. 3A and 3B illustrate operation of the sensor 2 in a dark environment, when the optical transmitter 4 is on (FIG. 2A) and the optical transmitter 4 is off (FIG. 2B).

When there is a dark environment without nearby reflectors, the light emitted by the transmitter 4 is predominantly absorbed at a distance from the sensor 2. The signal 24 is therefore negligibly small.

A dark environment without nearby reflectors may, for example, occur when the apparatus is placed on a night stand overnight in a darkened bedroom with the sensor outwardly facing.

A measurement made at the optical receiver 6, when the optical transmitter 4 is on and there is a dark environment, therefore provides an initial estimate of the systematic error 26.

If the optical transmitter 4 is then switched off, as illustrated in FIG. 3B, and a measurement taken at the optical receiver 6, then a background systematic error value is obtained. This background systematic error measurement can then be subtracted from the systematic error estimate to provide the systematic error 26.

The newly determined systematic error 26 can then be used as a compensation value in combination with the stored reference measurement 17 to determine a new reference signal. The compensation value is subtracted from the reference measurement 17.

The new reference signal can then be used to recalibrate the sensor 2 as described above.

FIG. 6 illustrates the process for re-calibration according to a trigger event. In the illustrated example, the trigger event is defined by a schedule. However, in other embodiments the trigger event by a state of the apparatus. For example, if the apparatus is a mobile cellular telephone, the trigger event may be the establishment of a telephone call. When a scheduled time arrives it is decided whether recalibration is required and, if it is required, it is performed. The schedule may initiate re-calibration periodically at set times in the day. The period will typically be of the order of hours, days, weeks or even months.

At block 60, the scheduled time arrives and the process begins. Next at block 61, the optical receiver 6 is controlled to take a measurement while the optical transmitter is switched off. The value of the measurement indicates whether the apparatus 10 is in a dark environment or a light environment. If the apparatus 10 is in a dark environment, the process proceeds to block 62. If, however, the apparatus is in a light environment, the process jumps to that illustrated in FIG. 7.

At block 62, the optical transmitter 4 is switched on and a measurement is taken at the optical receiver 6.

Next, at block 63, the measurement is compared against a threshold value. The value of the threshold value is set to detect the presence of reflectors near the sensor. This may, for example, occur when the apparatus is in a pocket and the pocket lining is adjacent the sensor 2. The measurement value will be greater than the threshold if there is an adjacent reflector.

If the measurement value is above the threshold, the process ends until the next scheduled time.

If the measurement is below the threshold, the process continues to block 64, where the optical transmitter 4 is switched off and a measurement is taken at the optical receiver 6.

Then at block 65 a compensation value is generated by subtracting the measurement taken at block 64 from that taken at block 62. The compensation value corresponds to the systematic error 26.

Then at block 66 the newly generated compensation value is subtracted from the reference measurement 17 to determine a new reference signal.

At block 67, the reference signal is used for recalibration as described above.

FIG. 7 illustrates the process for re-calibration when the apparatus 10 is in a light environment.

At block 71, the optical transmitter 4 is switched on and a measurement is taken at the optical receiver 6.

Next, at block 72, the measurement is compared against a threshold value. The value of the threshold is set to detect saturation of the sensor 2. This may occur, for example, when the sensor is exposed to sun light.

If the measurement value indicates sensor saturation, the process ends.

If the measurement value indicates that the sensor 2 is not saturated, then the process continues to block 73, where the optical transmitter 4 is switched off and a measurement is taken at the optical receiver 6.

Then at block 74 a compensation value is generated by subtracting the measurement taken at block 73 from that taken at block 71. The compensation value corresponds to the systematic error 26.

Then at block 75 the newly generated compensation value is subtracted from the reference measurement 17 to determine a new reference signal.

At block 76, the reference signal is used for recalibration as described above.

In the embodiments described with reference to FIGS. 6 and 7, when a compensation value is generated it is used to compensate the reference measurement and recalibrate the sensor.

In other embodiments, a sample of multiple different compensation values may be generated. The calibration system may then determine a single compensation value which is then used to compensate the reference measurement and recalibrate the sensor. The determination of the single compensation value may involve the selection of a value from multiple values or the averaging of selected values. In relation to FIG. 6, the value selected may be the one for which the measurement made at block 63 is lowest and/or the measurement made at block 65 is lowest. The sample of measurements may be taken at or around the same time to compensate for oscillating ambient light or movement of the apparatus. Alternatively, the sample of measurements may by taken over a prolonged period of time according to a schedule (e.g. once an hour or day) in the expectation that one of the measurements will occur during 'ideal' conditions.

The initial calibration process described with reference to FIG. 5 is suitable for a color sensor. For other types of sensors, such as proximity sensors, the initial white calibration process is not required and only the dark calibration is required during use to eliminate the systematic error.

The blocks illustrated in the FIGS. 5, 6 and 7 may represent steps in a method and/or sections of code in the computer program 15. The illustration of a particular order to the blocks does not necessarily imply that there is a required or preferred order for the blocks and the order and arrangement of the block may be varied.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:

an optical sensor comprising an optical transmitter and an optical receiver;

a calibration system configured to calibrate the sensor when a measurement taken at the optical receiver passes a test, wherein the measurement is taken while the optical transmitter is on and the apparatus is in use and wherein the calibration system is configured to calibrate the optical sensor by:

generating a compensation value using the measurement;

compensating a reference measurement using the compensation value; and calibrating the optical sensor using the compensated reference value.

2. An apparatus as claimed in claim 1, wherein the test comprises a reflector proximity test.

3. An apparatus as claimed in claim 1, wherein the test comprises a sensor saturation test.

4. An apparatus as claimed in claim 1, wherein the test comprises a best-in-sample test.

5. An apparatus as claimed in claim 1, wherein the test comprises comparison of the measurement against a threshold.

6. An apparatus as claimed in claim 5, wherein the threshold depends upon a contemporaneous measurement taken at the optical receiver of the sensor while the optical transmitter of the sensor is off.

7. An apparatus as claimed in claim 6, wherein the threshold has a reflector proximity test value or a sensor saturation test value depending upon the value of the contemporaneous measurement.

8. An apparatus as claimed in claim 1, comprising a memory system configured to store, during production of the apparatus, a reusable reference measurement taken at the optical receiver while the optical transmitter of the sensor is on and to store a default compensation value for initial calibration of the sensor.

9. An apparatus as claimed in claim 8, wherein the reference measurement is a white point calibration measurement.

10. An apparatus as claimed in claim 8, wherein the compensation value is a dark calibration value representing a measurement value at the optical receiver when the optical transmitter is on and there are no other optical sources.

11. An apparatus as claimed in claim 1, wherein the calibration system is configured to re-calibrate the sensor when a scheduled measurement taken at the optical receiver of the sensor, while the optical transmitter is on, passes the test.

12. An apparatus as claimed in claim 11 further comprising a protective screen in an optical path between the optical transmitter and the optical receiver whereby scheduled re-calibration compensates for progressive wear to the protective screen.

13. A method of automatically re-calibrating an optical sensor comprising:

taking a measurement at an optical receiver of the optical sensor while an optical transmitter of the optical sensor is on;

changing calibration of the optical sensor only if the taken measurement passes a test;

generating a compensation value using the measurement;

compensation a reusable reference measurement using the compensation value; and calibration the sensor using the compensated reference value.

14. A method as claimed in claim 13, wherein the test comprises comparison of the measurement against a threshold.

15. A method as claimed in claim 14, wherein the threshold depends upon a contemporaneous measurement taken at the optical receiver of the sensor while the optical transmitter of the sensor is off.

16. A method as claimed in claim 15, wherein the threshold has a reflector proximity test value or a sensor saturation test value depending upon the value of the contemporaneous measurement.

17. A method as claimed in claim 13, wherein the calibration system is configured to re-calibrate the sensor when a scheduled measurement taken at the optical receiver of the sensor, while the optical transmitter is on, passes the test.

* * * * *

UNITED STATES PATENT AND TRADEMARK OFFICE

CERTIFICATE OF CORRECTION

PATENT NO. : 7,623,230 B2
APPLICATION NO. : 11/977230
DATED : November 24, 2009
INVENTOR(S) : Niko Santeri Porjo It is certified that error appears in the above-identified patent and that said Letters Patent is hereby corrected as shown below:

IN THE CLAIMS:

In Claim 13: Column 8, line 16, delete "compensation" and replace with --compensating--.

In Claim 13: Column 8, line 18, delete "calibration" and replace with --calibrating--.

Signed and Sealed this

Second Day of March, 2010

David J. Kappos
*Director of the United States Patent and Trademark Office*